US008827378B2

(12) United States Patent
Toyohira et al.

(10) Patent No.: US 8,827,378 B2
(45) Date of Patent: Sep. 9, 2014

(54) BRAKE APPARATUS

(75) Inventors: Tomoya Toyohira, Wako (JP); Arata Inoue, Wako (JP); Kazuyoshi Akutsu, Wako (JP); Kunimichi Hatano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 772 days.

(21) Appl. No.: 12/675,322

(22) PCT Filed: Aug. 26, 2008

(86) PCT No.: PCT/JP2008/065627
§ 371 (c)(1),
(2), (4) Date: Mar. 12, 2010

(87) PCT Pub. No.: WO2009/047953
PCT Pub. Date: Apr. 16, 2009

(65) Prior Publication Data
US 2010/0219679 A1    Sep. 2, 2010

(30) Foreign Application Priority Data

Oct. 11, 2007    (JP) .............................. P2007-265914

(51) Int. Cl.
*B60T 8/34*    (2006.01)
*B60T 8/40*    (2006.01)
*G05G 5/03*    (2008.04)
*B60T 7/06*    (2006.01)
*B60T 11/18*    (2006.01)
*G05G 1/46*    (2008.04)

(52) U.S. Cl.
CPC ................ *B60T 8/4081* (2013.01); *G05G 5/03* (2013.01); *B60T 7/06* (2013.01); *B60T 11/18* (2013.01); *G05G 1/46* (2013.01)
USPC .................. 303/113.4; 303/113.5; 303/115.2

(58) Field of Classification Search
USPC ......... 303/113.4, 113.5, 115.2, 122; 188/152; 74/70, 78, 82, 83; 60/547.1, 545, 548, 60/555, 562, 578, 581, 582, 585, 589, 591
See application file for complete search history.

(56) References Cited

U.S. PATENT DOCUMENTS 3,261,438 A * 7/1966 Binder .......................... 192/99 S
3,911,760 A * 10/1975 Elbers et al. .................... 74/512

(Continued)

FOREIGN PATENT DOCUMENTS

CA    2 495 351 A1    7/2005
JP    07-215206 A    8/1995

(Continued)

*Primary Examiner* — Robert A Siconolfi
*Assistant Examiner* — Mahbubur Rashid
(74) *Attorney, Agent, or Firm* — Carrier Blackman & Associates, P.C.; William D. Blackman; Fulchand P Shende

(57) ABSTRACT

Brake apparatus (10; 110; 140) includes a transmission unit (75) for operatively connecting a brake pedal (12) to a master cylinder (17), and the transmission unit is capable of varying a ratio between an output amount of a push rod (86) connected to a master cylinder (17) and a movement amount of the brake pedal (12). Further, the transmission unit (75) is constructed such that, in a latter-half operation amount region (E2; E6; E9) of the brake pedal, the ratio of the operation amount of the brake pedal to the movement amount of the push rod is controlled, via the transmission unit, to increase in response to increase of the operation amount of the brake pedal.

4 Claims, 10 Drawing Sheets

(56) References Cited

U.S. PATENT DOCUMENTS

| | | | | |
|---|---|---|---|---|
| 5,165,299 | A * | 11/1992 | Mizuma et al. | 74/512 |
| 5,771,773 | A * | 6/1998 | Sakamoto et al. | 91/369.2 |
| 6,604,795 | B2 * | 8/2003 | Isono et al. | 303/11 |
| 6,666,105 | B2 * | 12/2003 | Wachi | 74/512 |
| 7,448,296 | B2 * | 11/2008 | Fukase | 74/516 |
| 7,614,320 | B2 * | 11/2009 | Fukase | 74/512 |
| 7,780,246 | B2 | 8/2010 | Hatano | |
| 2006/0076829 | A1 | 4/2006 | Mann et al. | |
| 2006/0278033 | A1 | 12/2006 | Wachi et al. | |
| 2007/0205659 | A1 | 9/2007 | Hatano | |

FOREIGN PATENT DOCUMENTS

| | | |
|---|---|---|
| JP | 11-171006 A | 6/1999 |
| JP | 3269239 | 1/2002 |
| JP | 2006-151167 | 6/2006 |
| JP | 2007-196726 A | 8/2007 |
| JP | 2007-230435 A | 9/2007 |
| WO | 2005-051736 A1 | 6/2005 |

\* cited by examiner

BRAKE APPARATUS

TECHNICAL FIELD

The present invention relates to vehicular brake apparatus including a transmission unit interconnecting an operation member and a master cylinder.

BACKGROUND ART

Among the conventionally-known vehicular braking apparatus are so-called "brake-by-wire" type brake apparatus (hereinafter referred to as "BBW type brake apparatus") which convert each braking operation by a human driver into an electrical signal to activate an electric fluid pressure production device and then activate brake cylinders with fluid pressure produced by the electric fluid pressure production device. Using such BBW type brake apparatus, it is possible to generate sufficient braking force with a reduced leg power (operating force) that is to be applied to an operation member in the form of a brake pedal.

The BBW type brake apparatus may present the problem that a motor of the electric fluid pressure production device becomes inoperative, for example, due to a failure of a main power supply (battery). To address the problem, Japanese Patent Application Laid-Open Publication No. 11-171006 (hereinafter referred to as "Patent Literature 1"), for example, proposes a brake apparatus which includes not only a main power supply (battery) but also an auxiliary power supply (battery) and which drives the motor using the auxiliary power supply (battery) in the event of a failure of the main power supply. However, the brake apparatus disclosed in Patent Literature 1 requires the auxiliary power supply and members for mounting the auxiliary power supply, which results in an increased number of necessary component parts. In addition, because a separate space for mounting the auxiliary power supply has to be secured, it tends to be time-consuming to consider an appropriate layout.

Therefore, there has been a great demand for a more sophisticated brake apparatus which, in the event of a failure of the main power supply, can operate the brake cylinders without using an auxiliary power supply. One example of such a sophisticated brake apparatus may be constructed in such a manner that, in the event of a failure of the main power supply, the fluid pressure of the master cylinder is increased by a leg power applied to the brake pedal and the brake cylinders are operated by the increased fluid pressure. In order to increase the fluid pressure of the master cylinder, it is preferable to set a lever ratio (i.e., operation amount of the brake pedal/output amount (movement amount) of a push rod connecting to the master cylinder) at a great value. Setting a great lever ratio like this can cause a great operational force to act on the push rod in response to a given operation amount of the brake pedal.

Further, from Japanese Patent No. 3269239 (hereinafter referred to as "Patent Literature 2") etc. there have been known brake apparatus which are constructed to enhance operability of the brake apparatus by varying a lever ratio in correspondence with an operation amount of the brake pedal (pedal operation amount). With the brake apparatus disclosed in Patent Literature 2, the lever ratio is decreased, i.e. the movement amount of the push rod responsive to the pedal operation amount is increased, in an operation region where the braking force is small, to achieve characteristics that can facilitate operation amount control. In an operation region where the braking force is great, on the other hand, the lever ratio is increased, i.e. the movement amount of the push rod responsive to the pedal operation amount is decreased, to achieve characteristics that can facilitate leg power control. Brake pedal device of the brake apparatus disclosed in Patent Literature 2 is constructed in a manner as shown in FIG. 10 in order to decrease the lever ratio in a region where the braking force is small and increase the lever ratio in a region where the braking force is great.

FIG. 10 is a side view of the brake pedal device disclosed in Patent Literature 2. In the brake pedal device 200, a brake pedal 201 has an upper end portion 201a pivotably mounted to a vehicle body via a first pivot shaft 202, and the brake pedal 201 is connected to a push rod 205 via a connection link 203 and pivot link 204. As a leg power is applied to (i.e., caused to act on) a pedal 207 of the brake pedal 201 as indicated by a white arrow, the brake pedal 201 pivots clockwise about the first pivot shaft 202. The pivot link 204 is pivotably connected to the vehicle body via a second pivot shaft 206.

Behavior of the brake pedal device 200 can be schematically represented in a manner as shown in FIGS. 11A and 11B. Namely, in the schematic representation of FIGS. 11A and 11B, a leg power is applied to the pedal 207 of the brake pedal 201 as indicated by a white arrow, so that the brake pedal 201 pivots clockwise about the first pivot shaft 202. Then, a first connection arm 208 of the brake pedal 201 presses the connection link 203 as indicated by a clockwise arrow via a first connection pin 209. Also, the connection link 203 presses a first arm 204a of the pivot link 204 via a second connection pin 211, so that the pivot link 204 pivots counterclockwise about the second pivot shaft 206. Then, a second arm 204b of the pivot link 204 moves a push rod 214 (corresponding to the push rod 205 of FIG. 10) via a third connection pin 213 as indicated by a leftward arrow, so that a piston 216 of a master cylinder moves as indicated by the leftward arrow.

FIG. 12 is a graph showing relationship between a pedal operation amount and lever ratio in the conventionally-known brake pedal device, where the vertical axis represents the lever ratio while the horizontal axis represents the pedal operation amount. In a pedal operation amount region 0-s1, the lever ratio increases as the pedal operation amount increases, as indicated by a curve g1. In a pedal operation amount region s1-s2, the lever ratio decreases as the pedal operation amount increases. Further, in a pedal operation amount region s2-s3, the lever ratio increases as the pedal operation amount increases. According to the curve g1, the brake pedal device 200 is set to be used in a pedal operation amount region s4-s5. Thus, it is possible to decrease the lever ratio in an initial brake pedal operation region e1 where the braking force is small and increase the lever ratio in a following brake pedal operation region e2 where the braking force is greater.

In this case, in order to increase the fluid pressure of the master cylinder by the leg power applied to the brake pedal 201 so that the brake cylinders can be operated by the applied leg power alone, the brake pedal 201 has to be moved up to the greatest possible operation amount s5. However, the lever ratio r1 when the brake pedal 201 is at the greatest possible operation amount s5 is lower than the maximum lever ratio r2. Thus, even with the brake pedal device 200 disclosed in Patent Literature 2, it would be difficult to operate the brake cylinders by increasing the fluid pressure of the master cylinder. Consequently, in order to increase the fluid pressure of the master cylinder up to operating pressures of the brake cylinders, the leg power to be applied by a human operator or driver has to be increased, which would impose an increased load on the human driver.

DISCLOSURE OF THE INVENTION

In view of the foregoing prior art problems, it is an object of the present invention to provide an improved brake apparatus which, in the event of a failure of the main power supply or the like, can appropriately operate a brake cylinder by increasing the fluid pressure of the master cylinder in response to an operating force applied to the operation member without imposing a great load on the human operator.

In order to accomplish the above-mentioned object, the present invention provides an improved brake apparatus, which comprises: an operation member; a brake cylinder; an electric braking-force control device for electrically controlling braking force in accordance with an operation amount or force of the operation member; a master cylinder for producing pressure of a brake fluid; and a transmission unit for operatively connecting the operation member to the master cylinder. In the present invention, the transmission unit is a mechanism capable of varying a ratio between an output amount of an output member thereof connected to the master cylinder and the operation amount of the operation member. In a latter-half operation amount region (i.e., latter-half region of the operable range or stroke) of the operation member, the ratio of the operation amount of the operation member to the output amount of the output member is controlled, via the transmission unit, to increase in response to increase of the operation amount of the operation member.

In the brake apparatus of the present invention, the transmission unit, operatively connecting the operation member and the master cylinder, is constructed to be able to vary the ratio between the output amount of the output member connected to the master cylinder and the operation amount of the operation member. More specifically, in the latter-half operation amount region of the operation member, the transmission unit can increase the ratio of the operation amount of the operation member to the output amount of the output member (hereinafter referred to "lever ratio") in response to increase of the operation amount of the operation member.

Thus, in the event of a failure of a main power supply, for example, the lever ratio can be increased, via the transmission unit, by a human operator or driver applying an operating force to the operation member to move the operation member up to the latter-half operation amount region. Such an arrangement can appropriately increase the fluid pressure of the master cylinder by increasing the output (operational force) of the output member with respect to the operating force applied to the operation member. In this way, the present invention can appropriately activate the brake cylinder by the fluid pressure of the master cylinder, without imposing a great load on the human driver.

In one embodiment, the ratio of the operation amount of the operation member to the output amount of the output member is controlled, via the transmission unit, to be smaller in a former-half operation amount region of the operation member than in the latter-half operation amount region of the operation member. Thus, in the former-half operation amount region of the operation member, the present invention can secure a sufficient output amount of the output member even with a reduced operation amount of the operation member. In this way, the present invention can secure a good operational feeling of the operation member with a reduced overall operation amount (i.e., reduced overall stroke) of the operation member.

In one embodiment, the brake apparatus further comprises a block member for blocking communication of the brake fluid between the master cylinder and the brake cylinder, and a simulator for accumulating the brake fluid supplied from the master cylinder while the block member is in an opened state. Further, an accumulation amount of the brake fluid in the simulator is controlled to be smaller than a maximum supply amount of the brake fluid from the master cylinder.

In many conventionally-known brake apparatus, a reactive-force permitting valve is provided in a fluid path that provides communication between the master cylinder and the simulator. In the event of a failure of a main power supply, for example, the reactive-force permitting valve closes the fluid path to cut off the simulator from the master cylinder. By the cutting off the simulator from the master cylinder, the fluid pressure of the master cylinder can be increased without the brake fluid being accumulated in the simulator. However, in the case where the reactive-force permitting valve is provided so as to increase the fluid pressure of the master cylinder in the event of a failure of the main power supply or the like, the number of necessary component parts in the brake apparatus would undesirably increase. To avoid the inconvenience, the accumulation amount of the brake fluid in the simulator of the present invention is controlled to be smaller than the maximum supply amount of the brake fluid from the master cylinder. Thus, while the block member is opened due to a failure of the main power supply or the like, the fluid pressure of the master cylinder can be increased by the brake fluid, having not been accumulated in the simulator, as the brake pedal is moved to the latter-half operation amount region. In this way, the present invention can remove or omit the reactive-force permitting valve from the fluid path providing communication between the master cylinder and the simulator. Further, by reducing the accumulation amount of the fluid in the simulator, the present invention can reduce the size of the simulator.

In one embodiment, when the brake fluid is accumulated in the simulator up to a predetermined maximum accumulation amount by the operation member being operated by a predetermined operation amount and then the operation amount of the operation member is further increased beyond the predetermined operation amount while the block member is in the opened state, the ratio of the operation amount of the operation member to the output amount of the output member is controlled to increase in response to increase of the operation amount. If the brake fluid is accumulated as the operation member is moved to the latter-half operation amount region in the event of a failure of the main power supply or the like, it would be difficult to efficiently increase the fluid pressure through the output of the output member produced by the operating force applied to the operation member. This is why the present invention is constructed in such a manner that, once the operation amount of the operation member is increased beyond the predetermined operation amount after the brake fluid has been accumulated in the simulator up to the predetermined maximum accumulation amount, the ratio of the operation amount of the operation member to the output amount of the output member is controlled to increase in response to increase of the operation amount. In this way, the present invention can efficiently increase the fluid pressure through the output of the output member produced by the operating force applied to the operation member and activate the brake cylinder with the thus-increased fluid pressure.

According to another aspect of the present invention, there is provided an improved brake apparatus, which comprises: an operation member; a brake cylinder; an electric braking-force control device for electrically controlling braking force in accordance with an operation amount or force of the operation member; a master cylinder for producing pressure of a brake fluid; a transmission unit for operatively connecting the operation member to the master cylinder, and a block member for blocking communication of the brake fluid between the master cylinder and the brake cylinder. In the present invention, the transmission unit includes a pivot link connected via the output member to the master cylinder, and a connection link interconnecting the pivot link and the operation member, and the connection link is arranged to be pulled away from the pivot link by the operation member as the operation member is operated from a non-operating position thereof.

Because the connection link is arranged to be pulled (rather than being pressed or pushed) by the operation member as the operation member is operated, it is possible to prevent the connection link from interfering with the operation member etc. Thus, in the latter-half operation amount region of the operation member, the lever ratio can be appropriately increased as the operation amount of the operation member increases, without the connection link from interfering with the operation member. As a consequence, in the event of a failure of a main power supply, for example, it is possible to increase the output (operational force) of the output member with respect to the operating force applied to the operation member. Thus, the present invention can increase the fluid pressure of the master cylinder and allows the brake cylinder to operate with the thus-increased fluid pressure.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which.

BEST MODE FOR CARRYING OUT THE INVENTION

First Embodiment

Figure 1:
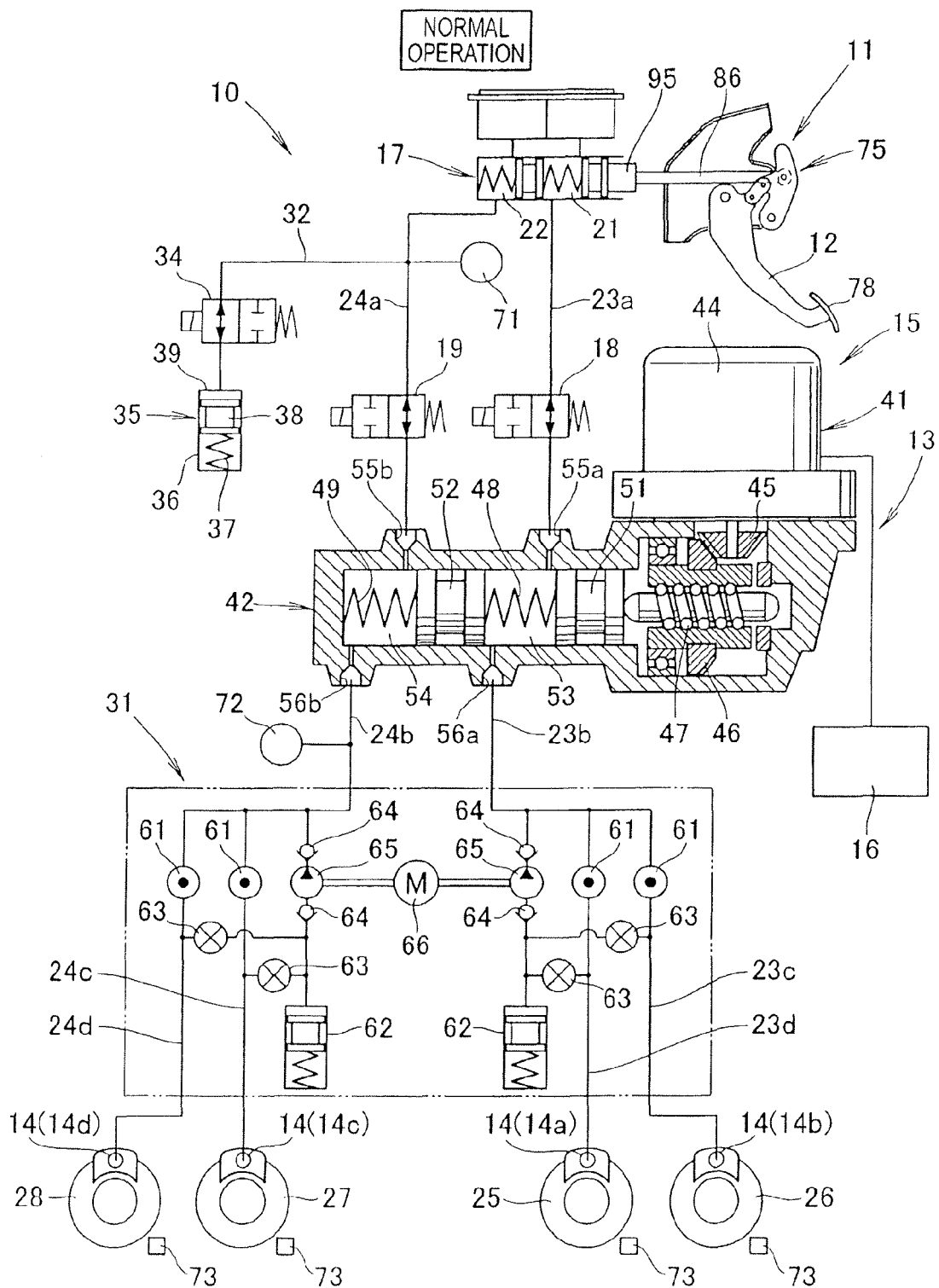
FIG. 1 is a diagram showing a fluid pressure circuit of a first embodiment of a brake apparatus of the present invention when the apparatus is in normal operation.

Reference is now made to the diagram of FIG. 1 showing a fluid pressure circuit of a first embodiment of a brake apparatus of the present invention when the apparatus is in normal operation. The brake apparatus 10 includes: a brake pedal device 11 having an operation member in the form of a pendant-type brake pedal 12 incorporated therein, a plurality of brake cylinders 14 for applying braking force to corresponding road wheels of a vehicle; an electric braking-force control device 13 capable of electrically controlling the braking force in accordance with an operation amount or leg power (operating force) applied to the brake pedal 12; a master cylinder 17 for producing fluid pressure in response to operation of the brake pedal 12; and a pair of block valves (block members) 18 and 19 for blocking communication of the brake fluid between the master cylinder 17 and the brake cylinders 14. The electric braking-force control device 13 includes an electric braking-force production section 15 and a control section 16, as will be later described in detail.

The brake cylinders 14 will be described below as comprising brake cylinders 14a and 14c for left and right front wheels and brake cylinders 14d and 14b for left and right rear wheels. The brake pedal device 11 will be detailed below with reference to FIGS. 2-5.

The master cylinder 17 is a tandem-type cylinder comprising two first fluid pressure chambers 21 and 22 for producing fluid pressure corresponding to a leg power (operating force) with which a human operator or driver of the vehicle has pressed on the brake pedal 12, i.e. which the human driver has applied to the brake pedal 12. One of the first fluid pressure chambers 21 is connected, via fluid paths 23a, 23b, 23c and 23d, to the brake cylinders 14a and 14b of disk brake devices 25 and 26 of the left front wheel and right rear wheel. The other first fluid pressure chamber 22 is connected, via fluid paths 24a, 24b, 24c and 24d, to the brake cylinders 14c and 14d of disk brake devices 27 and 28 of the right front wheel and left rear wheel.

One of the block valves 18, which is a normally-open electromagnetic valve, is provided in an intermediate portion of the fluid path 23a, and the other block valve 19, which is also a normally-open electromagnetic valve, is provided in an intermediate portion of the fluid path 24a. Further, the electric braking-force production section 15 of the electric braking-force control device 13 is provided between the fluid paths 23a and 23b and between the fluid paths 24a and 24b.

Further, an ABS (Antilock Brake System) device 31 is provided between the electric braking-force production section 15 and the disk brake devices 25-28. Operation amount simulator 35 is provided in a fluid path 32 branching from the fluid path 24a, via a reactive-force permitting valve 34 that is a normally-closed electromagnetic valve. The operation amount simulator 35 includes a cylinder 36, and a piston 38 slidably fitted in the cylinder 36 and normally urged by a spring 37. Further, in the operation amount simulator 35, a fluid chamber 39 is formed in a portion of the cylinder 36 opposite from the spring 37, and this fluid chamber 39 is in communication with the fluid path 32.

The electric braking-force production section 15 includes an actuator 41 and a cylinder body 42, and it is capable of electrically controlling the braking force in accordance with the operation amount or leg power of the brake pedal 12. The actuator 41 includes a driving bevel gear 45 mounted on an output shaft of an electric motor 44, a driven bevel gear 46 meshing with the driving bevel gear 45, and a ball screw mechanism 47 driven by the driven bevel gear 46.

Pistons 51 and 52 are slidably fitted in the cylinder body 42 and normally urged by respective return springs 48 and 49 in its returning or retreating direction. A pair of second fluid pressure chambers 53 and 54 are defined in front of respective ones of the pistons 51 and 52. One of the second fluid pressure chambers 53 communicates with the fluid path 23a via a port 55a and communicates with the fluid path 23b via a port 56a. The other second fluid pressure chambers 54 communicates with the fluid path 24a via a port 55b and communicates with the fluid path 24b via a port 56b.

In the electric braking-force production section 15, the pistons 51 and 52 advance or move forward (leftward in the figure), via the driving bevel gear 45, driven bevel gear 46 and ball screw mechanism 47, through activation of the electric motor 44. By such forward movement of the pistons 51 and 52, the ports 55a and 55b communicating with the fluid paths 23a and 24a are closed, so that fluid pressure is produced in the second fluid pressure chambers 53 and 54. The thus-produced fluid pressure is delivered to the fluid path 23b via the port 56a and to the fluid path 24b via the port 56b.

The ABS device 31 has two channels of a same construction, one of which is provided for the disk brake devices 25 and 26 of the left front wheel and right rear wheel and the other of which is provided for the disk brake devices 27 and 28 of the right front wheel and left rear wheel. Thus, the following paragraphs representatively describe only one of the channels of the ABS device 31 which is provided for the disk brake devices 25 and 26 of the left front wheel and right rear wheel.

The one channel of the ABS device 31 provided for the disk brake devices 25 and 26 of the left front wheel and right rear wheel includes input valves 61 in the form of a pair of normally-open electromagnetic valves, and output valves 63 in the form of a pair of normally-closed electromagnetic valves disposed between the input valves 61 and a reservoir 62. Fluid pressure pump 65 is sandwiched by a pair of check valves 64 between the reservoir 62 and the fluid path 23b, and this fluid pressure pump 65 is driven via an electric motor 66.

The control section 16 is provided for controlling the block valves 18 and 19, reactive-force permitting valve 34, electric braking-force production section 15 and ABS device 31. The control section 16 receives a signal corresponding to an operation amount or leg power of the brake pedal 12 and electrically controls the electric braking-force production section 15 on the basis of the received signal.

To the control section 16 are connected a fluid pressure sensor 71 for detecting fluid pressure produced by the master cylinder 17, a fluid pressure sensor 72 for detecting fluid pressure delivered to the disk brake devices 25 and 26, and wheel speed sensors 73 for detecting speeds of the individual wheels.

The following lines describe behavior of the brake apparatus 10 when the brake apparatus 10 is in normal operation. As the human operator operates the brake pedal 12 by applying a leg power (operating force) to the brake pedal 12, the block valves 18 and 19 each in the form of a normally-open electro-magnetic valve are demagnetized, and the reactive-force permitting valve 34 in the form of a normally-closed electromagnetic valve is excited to be opened.

Then, the fluid pressure sensor 71 provided in the fluid path 24a detects the pressing-on of the brake pedal 12, and the actuator 41 of the electric braking-force production section 15 is activated, in response to a pressing-on detection signal output from the fluid pressure sensor 71, so that the pistons 51 and 52 move forward.

By such forward movement of the pistons 51 and 52, fluid pressure is produced in each of the second fluid pressure chambers 53 and 54. The thus-produced fluid pressure is delivered to the brake cylinders 14a, 14b, 14c and 14d of the disk brake devices 25, 26, 27 and 28 by way of the opened input valves 61 of the ABS device 31 to thereby brake the individual wheels.

As the pistons 51 and 52 of the electric braking-force production section 15 move forward slightly, the ports 55a and 55b are closed with the pistons 51 and 52, so that not only the communication between the liquid path 23a and the second fluid pressure chamber 53 but also the communication between the liquid path 24a and the second fluid pressure chamber 54 is interrupted. Thus, the fluid pressure produced in the master cylinder 17 is prevented from being delivered to the disk brake devices 25, 26, 27 and 28.

At that time, the fluid pressure produced in the other first fluid pressure chamber 22 of the master cylinder 17 is delivered to the fluid chamber 39 of the operation amount simulator 35 by way of the reactive-force permitting valve 34. The piston 38 of the operation amount simulator 35 is moved by the delivered fluid pressure against the biasing force of the spring 37. In this way, not only a considerable operation amount of the brake pedal 12 is permitted but also a simulated reactive force of the brake pedal 12 can be created, so that an uncomfortable feeling of the human driver can be effectively eliminated.

The operation of the actuator 41 of the electric braking-force production section 15 is controlled so that the fluid pressure of the section 15 detected by the fluid pressure sensor 72 takes a level corresponding to the fluid pressure of the master cylinder 17, detected by the fluid pressure sensor 71. Through this control, braking force corresponding to the leg power applied to the brake pedal 12 is produced in the disk brakes 25, 26, 27 and 28.

It is possible that, during the braking operation of the brake apparatus 10, some of the wheels will present an increased slip ratio to get into a "lock tendency". In this case, that the wheel has gotten into a lock tendency is detected on the basis of the output of the wheel speed sensors 73.

When such a wheel lock tendency has been detected, not only the block valves 18 and 19, each in the form of a normally-open electromagnetic valve, are excited to be closed but also the electric braking-force production section 15 is kept in an operating state to keep activating the ABS device 31, to thereby avoid the locking of the wheel.

Namely, once any one of the wheels gets into a lock tendency, the input valve 61 leading to the brake cylinder 14a, 14b, 14c, 14d of the wheel is closed to interrupt the delivery of the fluid pressure from the electric braking-force production section 15 to the brake cylinder. In this condition, the outlet valve 63 is opened to allow the fluid pressure of the brake cylinder 14a, 14b, 14c, 14d to escape to the reservoir 62, to thereby reduce the fluid pressure.

Then, the output valve 63 is closed to retain the fluid pressure of the brake cylinder 14a, 14b, 14c, 14d, to thereby reduce the braking force to prevent the wheel from being locked.

Thus, the wheel speed is recovered, so that the slip ratio decreases. Once the slip ratio decreases, the input valve 61 is opened to increase the fluid pressure of the brake cylinder 14a, 14b, 14c, 14d, to thereby increase the braking force.

Then, once any one of the wheels gets into a lock tendency due to an increase in the fluid pressure, the aforementioned reduction, retention and increase of the fluid pressure is repeated. Through such repetition of the reduction, retention and increase of the fluid pressure, the instant embodiment produces greatest possible braking force while appropriately controlling or preventing locking of the wheels. The brake fluid having flown into the reservoir 62 during the repetition of the reduction, retention and increase of the fluid pressure is returned to the immediately-upstream liquid path 23b or 24b.

During control by the ABS device 31, the block valves 18 and 19 are maintained in the closed state. In this way, it is possible to prevent a fluid pressure change, caused by the operation of the ABS device 31, from being delivered as kickback from the master cylinder 17 to the brake pedal 12.

In hybrid vehicles provided with an electric motor for running the vehicle and electric-powered vehicles, the following control is performed to permit cooperation between the fluid pressure control and regenerative braking.

Namely, when it has been determined that the regenerative braking is possible with the brake pedal 12 pressed on, the electric braking-force production section 15 is deactivated and the regenerative braking is prioritized over the fluid pressure control, so that an energy recovery efficiency can be enhanced.

During execution of the regenerative braking, the ports 55a and 55b of the electric braking-force production section 15 are kept opened. Thus, the block valves 18 and 19 are switched to the closed state so that the fluid pressure produced in the master cylinder 17 can be prevented from being delivered to the brake cylinders 14a, 14b, 14c and 14d.

Note that, when any one of the wheels has gotten into a lock tendency during execution of the regenerative braking, the regenerative braking is terminated and switching is made to the control by the ABS device 31.

Figure 2:
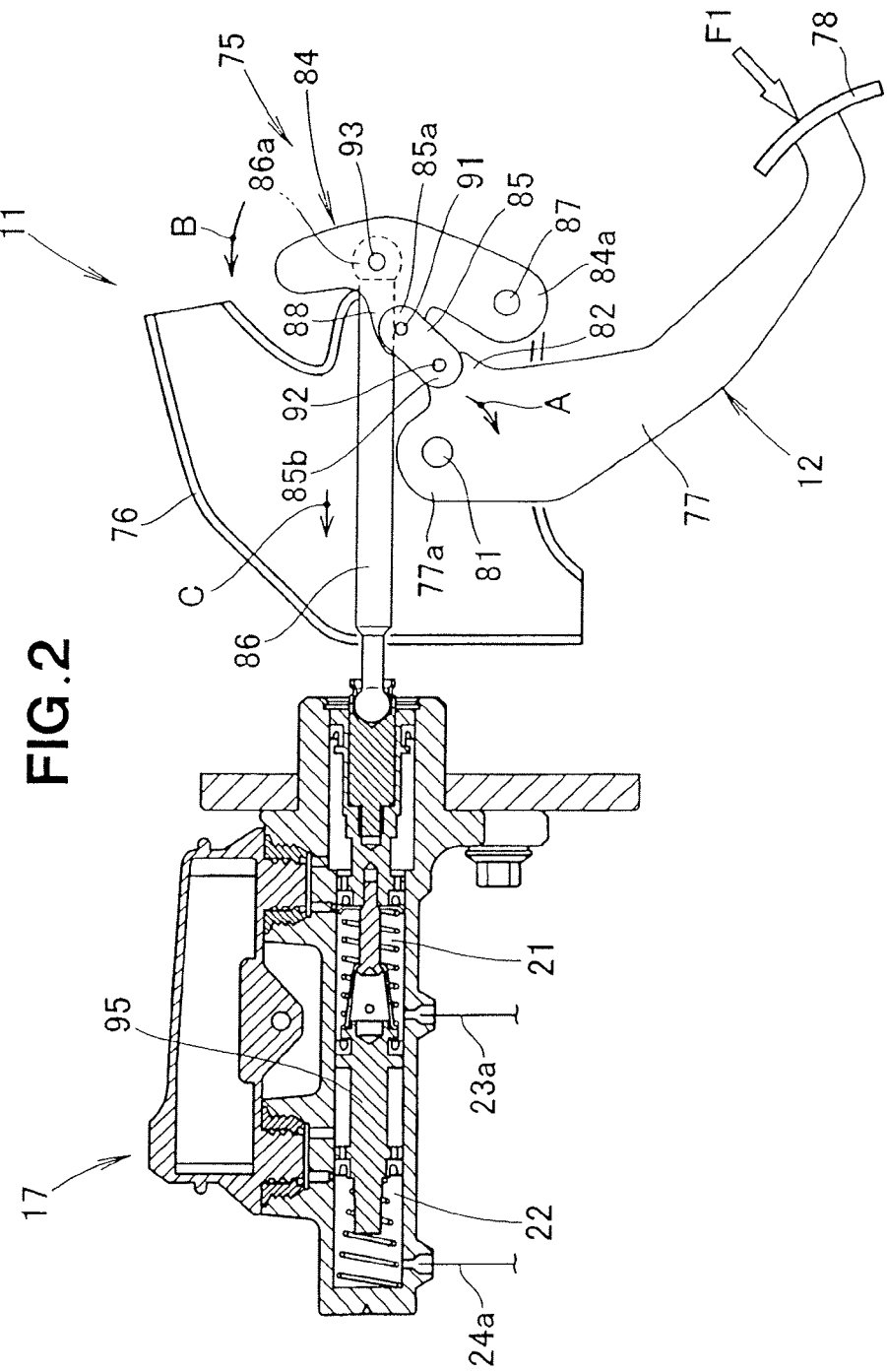
FIG. 2 is a sectional view showing an operation amount simulator employed in the first embodiment of the brake apparatus.
Figure 3:
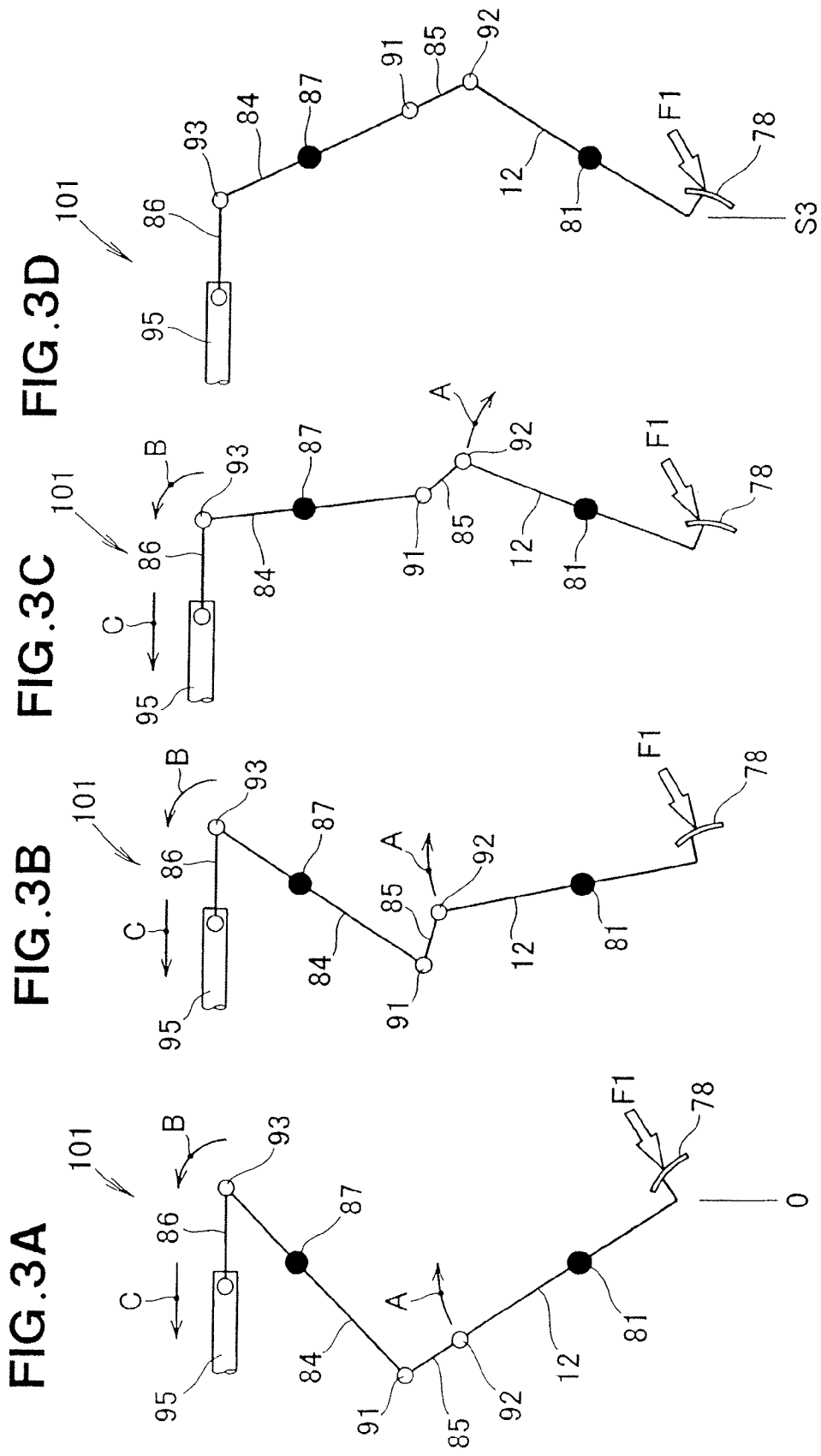
FIGS. 3A-3D are views schematically showing behavior of a brake pedal device employed in the first embodiment of the brake apparatus.

FIG. 2 is a side view showing the brake pedal device 11 in the first embodiment of the brake apparatus of the present invention. The brake pedal device 11 includes the brake pedal 12 operable by the human driver applying thereto a leg power, and a transmission unit 75 interconnecting the brake pedal 12 and the master cylinder 17.

The brake pedal 12 includes a lever section 77 pivotably connected to a mounting bracket 76, and a pedal 78 fixed to a lower end portion of the lever section 77. The lever section 77 has an upper end portion 77a pivotably connected via a first pivot shaft 81 to the mounting bracket 76, and it has an upper arm 82 adjoining the upper end portion 77a. The mounting bracket 76 is a member fixed to a vehicle body.

The transmission unit 75 includes a pivot link 84 pivotably connected to the mounting bracket 76, a connection link 85 connecting the pivot link 84 to the upper arm 82 of the lever section 77, and a push rod (output member) 86 connected to the pivotal link 84.

The pivot link 84 has a lower end portion 84a pivotably connected to the mounting bracket 76 via a second pivot shaft 87. The connection link 85 has one end portion 85a pivotably connected to a middle arm 88 of the pivot link 84 via a first connection pin 91. The connection link 85 has another end portion 85b pivotably connected to the upper arm 82 via a second connection pin 92.

The push rod 86 has a rear end portion 86a pivotably connected, via a third connection pin 93, to a portion of the pivot link 84 near the middle arm 88. The push rod 86 is connected to a piston 95 of the master cylinder 17. Namely, the pivot link 84 is connected to the piston 95 of the master cylinder 17 via the push rod 86 and third connection pin 93.

Behavior of the brake pedal device 11 can be schematically represented in a manner as shown in FIGS. 3A-3D. Namely, FIGS. 3A-3D show a modeled brake apparatus (i.e., modeled version of the brake pedal device) 101, in which are used the same reference numerals and characters as used for the brake pedal device 11.

Leg power F1 is applied to (acts on) the pedal 78 of the brake pedal 12, so that the brake pedal 12 pivots clockwise about the first pivot shaft 81. More specifically, as shown in FIGS. 3A to 3D, the brake pedal 12 pivots in the clockwise direction in a pedal operation amount region 0-S3 (see also FIG. 4).

As the brake pedal 12 pivots in the clockwise direction as noted above, it strongly pulls the connection link 85 (rather than pressing the connection link 85), in a direction away from the pivot link 84, via the second connection pin 92 as indicated by arrow A. By being thus pulled, the connection link 85 does not interfere with the brake pedal 12 during human driver's operation of the brake pedal 12. In response to the pivotal movement, in the arrow A direction, of the connection link 85, the pivot link 84 is pulled by the connection link 85 to pivot in the counterclockwise direction about the second pivot shaft 87 as indicated by arrow B.

In response to the pivotal movement, in the arrow B direction, of the pivot link 84, the push rod 86 moves as indicated by arrow C, so that the piston 95 of the master cylinder 17 moves in the arrow C direction. Hereinbelow, an amount of the movement (i.e., output amount) of the push rod 86 will be referred to as "push rod movement amount".

As set forth above, the modeled brake pedal device 101 is constructed as a link mechanism which, in response to human driver's operation of the brake pedal 12 in the operation amount region 0-S3, pivots the pivot link 84 by pulling (rather than pressing) the connection link 85 as indicated by arrow A to thereby pull the pivot link 84.

Namely, the modeled brake pedal device 101 pulls the connection link 85 and pivot link 84 in accordance with an operating force applied to the brake pedal 12. In other words, the connection link 85 is arranged to be pulled by the brake pedal 12 as the brake pedal 12 is operated by the human driver. In this way, in the operation amount region 0-S3, it is possible to avoid unwanted interference between the brake pedal 12, connection link 85, pivot link 84, etc.

Figure 4:
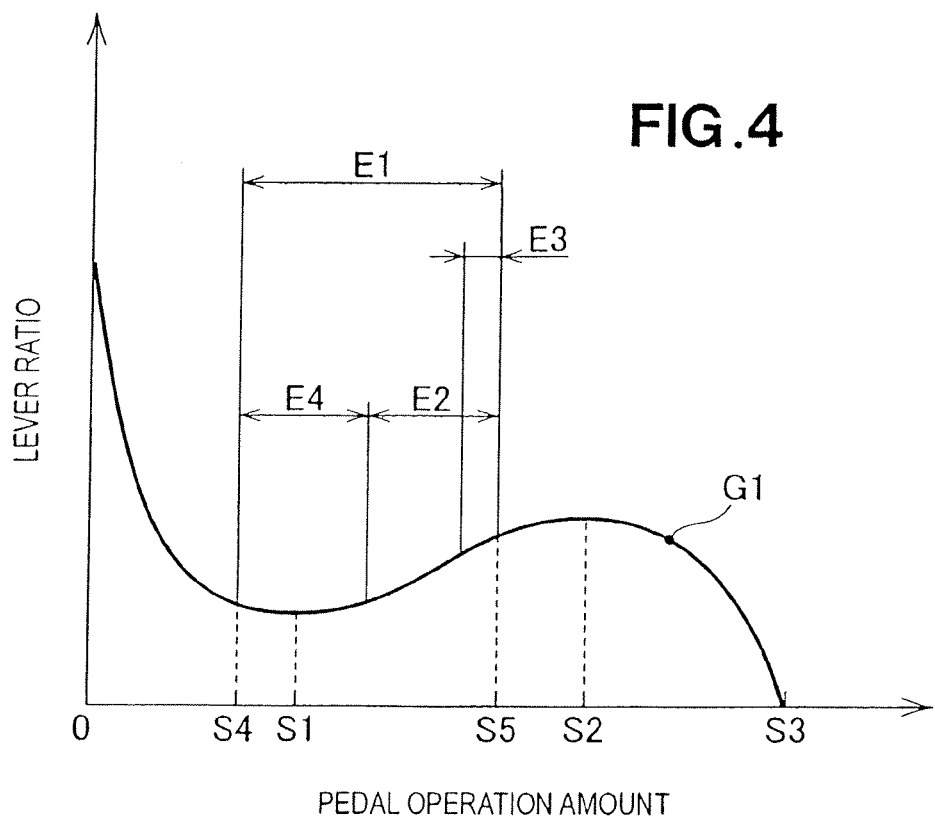
FIG. 4 is a graph showing relationship between a pedal operation amount and a lever ratio of the brake pedal device in the first embodiment of the brake apparatus.

FIG. 4 is a graph showing relationship between the pedal operation amount and the lever ratio in the first embodiment of the brake apparatus, where the vertical axis represents the lever ratio while the horizontal axis represents the pedal operation amount. The lever ratio is a ratio of the operation amount of the brake pedal to the movement amount of the push rod 86 connected to the master cylinder 17.

Namely, the lever ratio=the brake pedal operation amount/ the push rod movement amount. The brake pedal operation amount represents an operation amount of the brake pedal within the range from the zero amount shown in FIG. 3A to the amount of S3 shown in FIG. 3D.

In a pedal operation amount region 0-S1, the lever ratio decreases as the pedal operation amount increases, as indicated by a curve G1. In a pedal operation amount region S1-S2, the lever ratio increases as the pedal operation amount increases. Further, in a pedal operation amount region S2-S3, the lever ratio decreases as the pedal operation amount increases. Namely, the transmission unit 75 employed in the brake apparatus of the present invention is a mechanism capable of varying the lever ratio through changes in angular and positional relationship between the pivot link 84 and the connection link 85 responsive to the movement of the brake pedal 12. In other words, the link mechanism of the transmission unit 75 is constructed to vary the lever ratio in response to movement, by the human driver, of the brake pedal 12.

According to the curve G1 in FIG. 4, the brake pedal device 11 is set to be used in an entire pedal operation amount region E1 (i.e., S4-S5). Namely, in this case, the pedal operation amount S4 is an initial position, i.e. operation start position, of the brake pedal device 11.

With the pedal operation amount of the brake pedal device 11 set in the region E1 as set forth above, the lever ratio (i.e., ratio of the operation amount of the brake pedal to the push rod movement amount) in a latter-half operation amount region E2 (particularly, region E3 close to the operation amount S5) of the entire region E1 can be increased in response to increase of the pedal operation amount.

As set forth above, the connection link 85 in the brake pedal device 11 shown in FIG. 2 is constructed to be pulled by the brake pedal 12 in response to human operator's operation of the brake pedal 12 in the operation amount region 0-S3. Namely, the connection link 85 is arranged to be pulled away from the pivot link 84 by the brake pedal 12 as the brake pedal 12 is operated by the human driver at the initial position S4. In this way, in the operation amount region E1 (S4-S5), it is possible to avoid unwanted interference between the various component parts, such as the brake pedal 12, connection link 85 and pivot link 84 of FIG. 3, during operation of the brake pedal device 11.

In addition, by permitting variation in the lever ratio of the brake pedal device 11 shown in FIG. 2, the instant embodiment can increase the lever ratio in the latter-half operation amount region E2 (particularly, region E3 close to the amount S5) while keeping the pedal operation amount region E1 (i.e., overall stroke of the brake pedal 12) at an appropriate length by, for example, changing the length of the connection link 85 or using a desired one of connection links 85 of different lengths.

Figure 5:
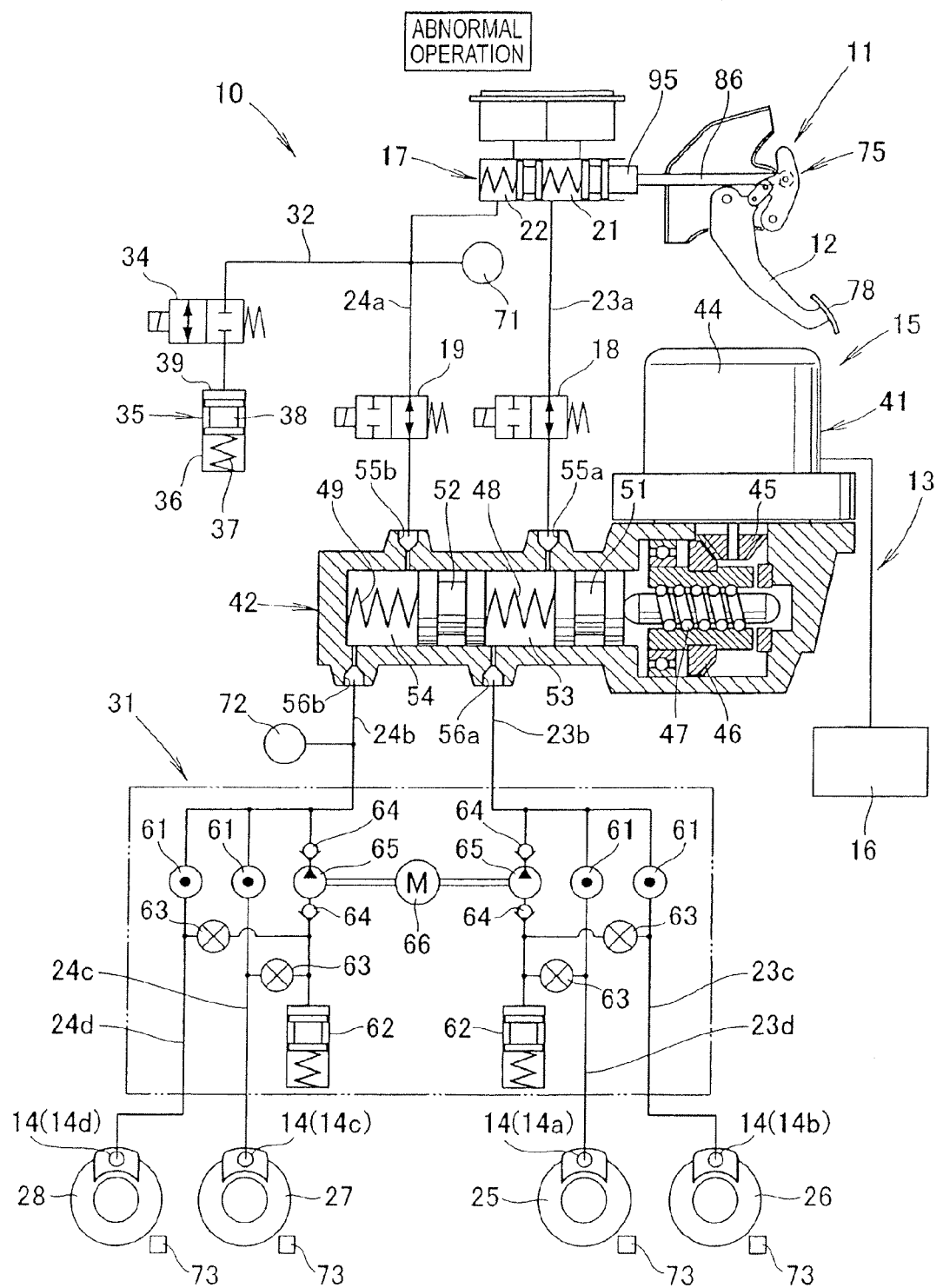
FIG. 5 is a diagram showing a fluid pressure circuit of the first embodiment of the brake apparatus of the present invention when the apparatus is in abnormal operation.

FIG. 5 is a diagram showing a fluid pressure circuit of the first embodiment of the brake apparatus of the present invention when the apparatus is in abnormal operation. In the brake apparatus 10, the electric braking-force production section 15 may become inoperative, for example, due to a power supply failure. In such a case, necessary braking is effected on the basis of the fluid pressure produced in the master cylinder 17 in place of the fluid pressure produced in the electric braking-force production section 15. Once the power supply fails, the block valves 18 and 19 each in the form of a normally-open electromagnetic valve are automatically opened, and the reactive-force permitting valve 34 in the form of a normally-closed electro-magnetic valve is automatically closed. Simultaneously, the input valves 61 each in the form of a normally-open electromagnetic valve are automatically opened, and the output valves 63 each in the form of a normally-closed electromagnetic valve are automatically closed.

With the reactive-force permitting valve 34 closed, the fluid pressure produced in each of the first fluid pressure chambers 21 and 22 of the master cylinder 17 can be prevented from being absorbed in the operation amount simulator 35.

Further, with the block valves 18 and 19 and input valves 61 opened and the output valves 63 closed, the fluid pressure produced in the first fluid pressure chambers 21 and 22 can activate the brake cylinders 14a, 14b, 14c and 14d of the brake devices 25, 26, 27 and 28 of the individual wheels by way of the block valves 18 and 19, second fluid chambers 53 and 54 of the electric braking-force production section 15 and valves 61. As a consequence, necessary braking force can be produced appropriately even when the power supply is in failure.

When braking force is to be produced by the fluid pressure of the master cylinder 17 in this case, it is necessary to increase the fluid pressure of the master cylinder 17 up to necessary braking fluid pressure only by a leg power applied to the brake pedal 12.

In the latter-half operation amount region E2 (more particularly, region E3 close to the amount S5), as shown in FIG. 4, the brake pedal device 11 can increase the lever ratio (i.e., ratio of the pedal operation amount to the push rod movement amount) in response to increase of the pedal operation amount. Thus, the push rod 86 is allowed to impart a greater output (pressing force) in response to a given leg power applied to the brake pedal 12. Therefore, even when the power supply is in failure, it is possible to increase the fluid pressure of the master cylinder up to necessary braking fluid pressure without imposing a great load on the human driver, so that necessary braking force can be produced appropriately with no difficulty.

Further, in a former-half operation amount region E4, the brake pedal device 11 can make the lever ratio smaller than that in the latter-half operation amount region E2. Thus, in the former-half operation amount region E4, it is possible to move the push rod 86 by a necessary amount with a small operation amount of the brake pedal 12. As a result, the instant embodiment permits reduction in the necessary pedal operation amount (i.e., necessary stroke of the brake pedal 12) and thereby secure a good operational feeling.

[Modification 1]

Whereas the above-described brake apparatus 10 has been described as including the reactive-force permitting valve 34 provided in the liquid pressure circuit so as to prevent the fluid pressure from being absorbed in the operation amount simulator 35 while the block valves 18 and 19 are kept opened due to a failure of the main power supply or the like, the present invention is not so limited, and the accumulation amount of the fluid in the operation amount simulator 35 may be kept less than the maximum supply amount of the fluid from the master cylinder 17. By keeping the accumulation amount of the fluid in the operation amount simulator 35 less than the maximum supply amount of the fluid from the master cylinder 17, the fluid pressure of the master cylinder 17 can be increased by the brake fluid, having not been accumulated in the operation amount simulator 35, when the brake pedal 12 has been moved to the latter-half operation amount region E2 (see FIG. 4) while the valves 18 and 19 are opened due to a failure of the main power supply or the like. In this way, the reactive-force permitting valve 34 can be removed or omitted from the fluid path 24a providing communication between the master cylinder 17 and the operation amount simulator 35, and thus, the number of the necessary component parts can be reduced. Further, by reducing the accumulation amount of the fluid in the operation amount simulator 35, the simulator 35 can be reduced in size.

[Modification 2]

Above-described modification 1 of the brake apparatus may be modified as follows. Namely, modification 2 of the brake apparatus may be constructed in such a manner that the lever ratio (i.e., ratio of the pedal operation amount to the push rod amount) increases as the operation amount of the brake pedal 12 further increases beyond a predetermined operation amount after the brake pedal 12 has been operated to the predetermined operation amount to cause the brake fluid to be accumulated in the operation amount simulator 35 to a predetermined maximum accumulation amount while the valves 18 and 19 are in the open state.

After the brake fluid is accumulated in the operation amount simulator 35 to the predetermined maximum accumulation amount, the lever ratio may be increased in response to increase of the pedal operation amount, by which the fluid pressure can be increased efficiently. In this way, it is possible to secure a good operational feeling when the human driver operates the brake pedal 12.

Whereas the first embodiment of the brake apparatus 10 has been described above in relation to the case where the relationship between the pedal operation amount and the lever ratio of the brake pedal device 11 is set such that the brake pedal device 11 is used in the pedal operation amount region E1 of the curve G1 shown in FIG. 4, the relationship between the pedal operation amount and the lever ratio of the brake pedal device 11 is not so limited. The relationship between the pedal operation amount and the lever ratio of the brake pedal device 11 may be set like modification 3 shown in FIG. 6 and modification 4 shown in FIG. 7.

[Modification 3]

Figure 6:
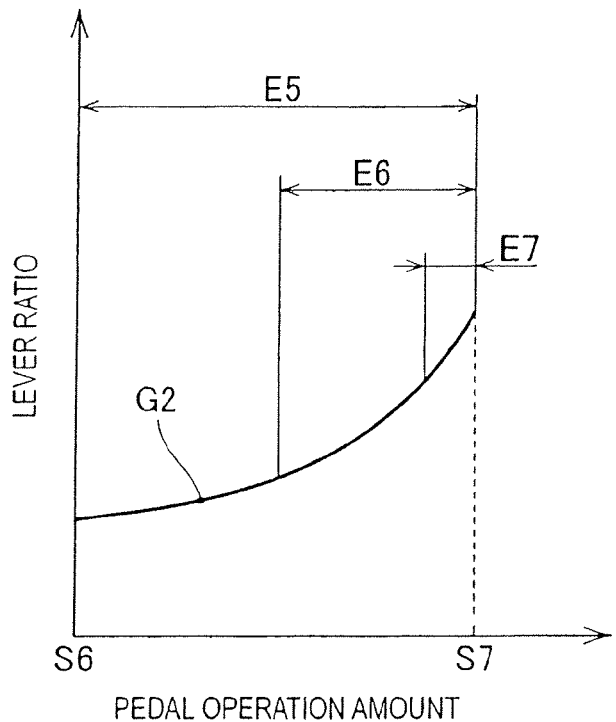
FIG. 6 is a graph showing modification 3, i.e. modified relationship between the pedal operation amount and the lever ratio.

FIG. 6 is a graph showing modification 3, i.e. modified relationship between the pedal operation amount and the lever ratio, where the vertical axis represents the lever ratio while the horizontal axis represents the pedal operation amount. In this modification, the lever ratio is increased gradually as indicated by a graph G2 in accordance with pedal operation amounts from a start-position operation amount S6 to an end-position operation amount S7 of the brake pedal 12.

According to this modification 3, the lever ratio can be increased in response to increase of the pedal operation in a latter-half operation amount region E6 (particularly, region E7 close to the end-position operation amount S7) of an entire pedal operation amount region E5 of the brake pedal 12. Thus, the brake pedal device employing this modification 3 can afford the same advantageous benefits as the brake pedal device 11 of the first embodiment.

[Modification 4]

Figure 7:
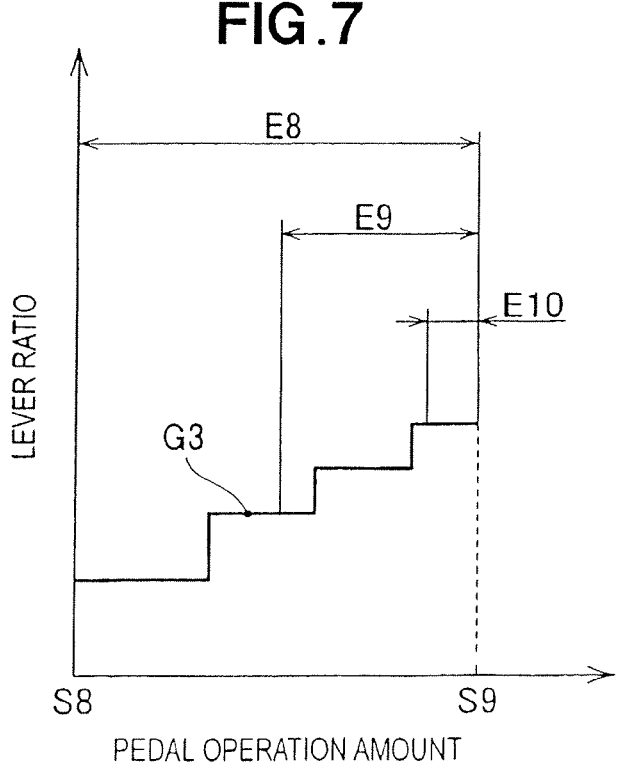
FIG. 7 is a graph showing modification 4, i.e. modified relationship between the pedal operation amount and the lever ratio.

FIG. 7 is a graph showing modification 4, i.e. modified relationship between the pedal operation amount and the lever ratio, where the vertical axis represents the lever ratio while the horizontal axis represents the pedal operation amount. In this modification, the lever ratio is increased stepwise as indicated by a graph G3 in accordance with pedal operation amounts from a start-position operation amount S8 to an end-position operation amount S9 of the brake pedal 12.

According to this modification 4, the lever ratio can be increased in response to increase of the pedal operation amount in a latter-half operation amount region E9 (particularly, region E10 close to the end-position operation amount S9) of an entire pedal operation amount region E8 of the brake pedal 12. Thus, the brake pedal device employing this modification 4 can afford the same advantageous benefits as the brake pedal device 11 of the first embodiment.

Next, with reference to FIGS. 8 and 9, a description will be given about second and embodiments of the brake apparatus of the present invention. Similar elements to those in the first embodiment are indicated by the same reference numerals and characters as used for the first embodiment and will not be described here to avoid unnecessary duplication.

Second Embodiment

Figure 8:
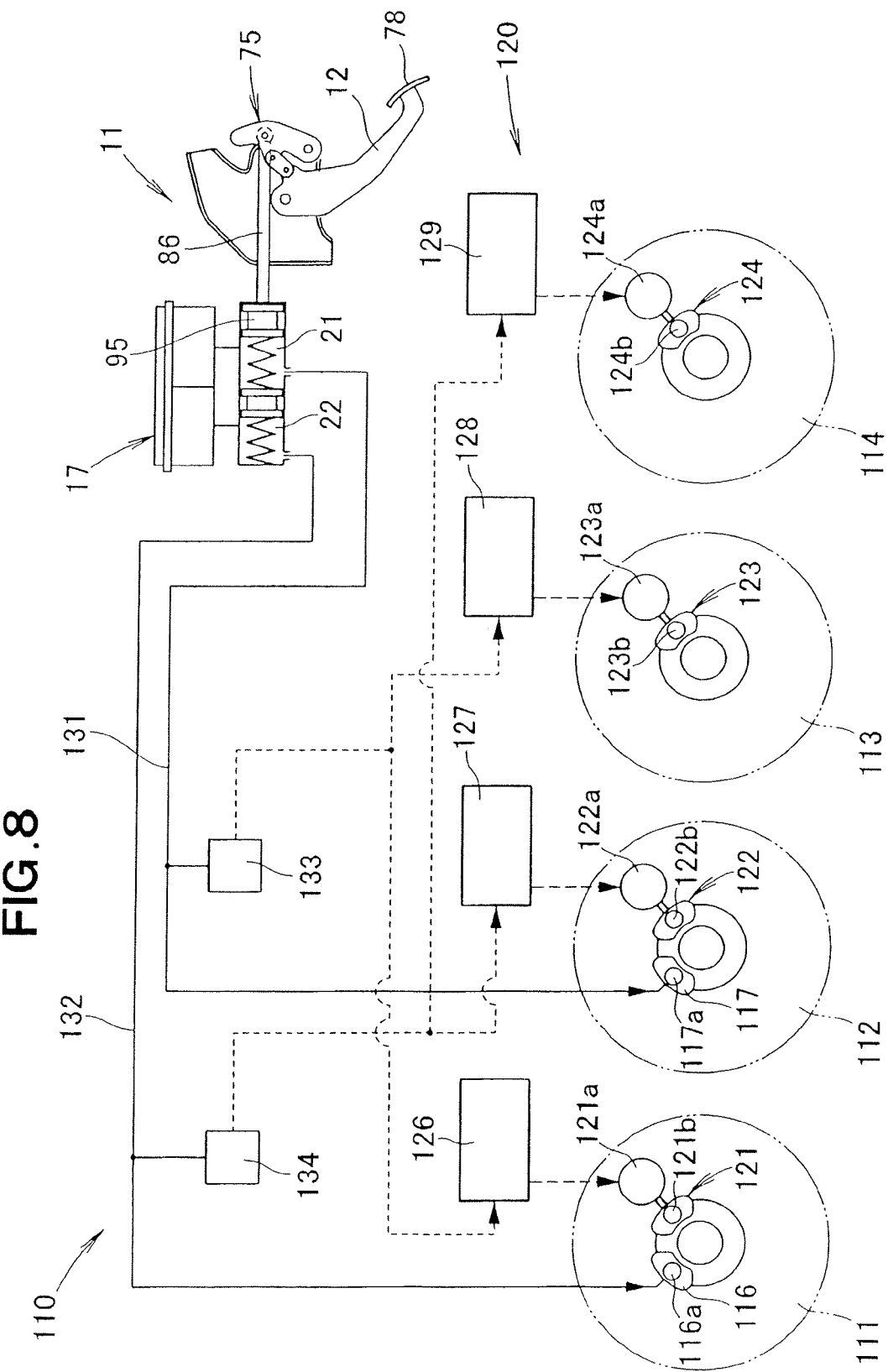
FIG. 8 is a diagram showing a fluid pressure circuit of a second embodiment of the brake apparatus of the present invention.

FIG. 8 is a diagram showing a fluid pressure circuit of the second embodiment of the brake apparatus 110 of the present invention. The brake apparatus 110 includes: the brake pedal device 11 having the brake pedal 12 incorporated therein; hydraulic brakes 116 and 117 for applying braking force to left and right front wheels 111 and 112; an electric braking-force control device 120 capable of electrically controlling the braking force in accordance with an operation amount or leg power (operating force) of the brake pedal 12; and the master cylinder 17 for producing pressure of a brake fluid in response to operation of the brake pedal 12.

The electric braking-force control device 120 includes electric braking-force production sections 121, 122, 123, 124 for producing and applying braking force to the left and right front wheels 111 and 112 and left and right rear wheels 113 and 114, and first to fourth control sections 126, 127, 128 and 129 for controlling the braking-force production sections 121, 122, 123 and 124 in accordance with the operation amount or operating force of the brake pedal 12.

Braking force to be applied to the left and right front wheels 111 and 112 by the hydraulic brakes 116 and 117 is set at ⅙ of a leg power. The hydraulic brakes 116 and 117 each include a brake cylinder 116a or 117a for applying the braking force to a corresponding one of the left and right front wheels 111 and 112.

Braking force to be applied to the left and right front wheels 111 and 112 and left and right rear wheels 113 and 114 by the electric braking-force production sections 121, 122, 123 and 124 is set at ⅙ of a leg power. Each of the electric braking-force production sections 121, 122, 123 and 124, producing braking force through an electromagnetic force, includes a brake cylinder 121b, 122b, 123b or 124b for applying the braking force to a corresponding one of the wheels.

The following lines describe behavior of the brake apparatus 10 when in normal operation. As the human operator operates the brake pedal 12 by applying a leg power (operating force) to the brake pedal 12, fluid pressure is produced in each of the first fluid pressure chambers 21 and 22.

The fluid pressure produced in one of the first fluid pressure chambers 21 is delivered, via a fluid path 131, to the hydraulic brake 117 for the right front wheel 112, while the fluid pressure produced in the other first fluid pressure chamber 22 is delivered, via a fluid path 132, to the hydraulic brake 116 for the left front wheel 111.

Thus, the hydraulic brakes 116 and 117 for the left and right front wheels 111 and 112 are activated so that the left and right front wheels 111 and 112 are braked by the corresponding brake cylinders 116a and 117a. Each of the hydraulic brakes 116 and 117 imparts the corresponding left or right front wheel 111 or 112 with braking force that is ⅙ of the leg power.

The fluid pressure produced in the one fluid pressure chamber 21 is detected by a first fluid pressure sensor 133, and the fluid pressure detection signal output by the sensor 133 is delivered to the first and third control sections 126 and 128.

On the basis of the delivered fluid pressure detection signal output by the sensor 133, each of the first and third control sections 126 and 128 generates and outputs a driving signal to a corresponding one of the electric braking-force production sections 121 and 123 for the left front and rear wheels 111 and 113, so that each of electric motors 121a and 123a of the electric braking-force production sections 121 and 123 is activated in response to the driving signal.

Through the activation of the electric motors 121a and 123a, the brake cylinders 121b and 123b are activated in the electric braking-force production sections 121 and 123 for the left front and left rear wheels 111 and 113, to thereby brake the left front and left rear wheels 111 and 113. Each of the electric braking-force production sections 121 and 123 imparts the corresponding left front or left rear front wheel 111 or 113 with braking force that is ⅙ of the leg power.

Similarly, the fluid pressure produced in the other first fluid pressure chambers 22 is detected by a second fluid pressure sensor 134, and the fluid pressure detection signal output by the sensor 134 is delivered to the second and fourth control sections 127 and 129.

On the basis of the fluid pressure detection signal output by the sensor 133, each of the second and fourth control sections 127 and 129 generates and outputs a driving signal to a corresponding one of the electric braking-force production sections 122 and 124 for the right front and right rear wheels 112 and 114, so that each of electric motors 122a and 124a of the electric braking-force production sections 122 and 124 is activated in response to the driving signal.

Through the activation of the electric motors 122a and 124a, the brake cylinders 122b and 124b are activated in the electric braking-force production sections 122 and 124 for the right front and right rear wheels 112 and 114, to thereby brake the right front and right rear wheels 112 and 114. Each of the electric braking-force production sections 122 and 124 imparts the corresponding right front or rear front wheel 112 or 114 with braking force that is ⅙ of the leg power.

Namely, in the second embodiment of the brake apparatus 110, braking force that is ⅓ of the leg power can be imparted to the left front wheel 111 by the hydraulic brake 116 and electric braking-force production section 121 for the left front wheel 111, and braking force that is ⅓ of the leg power can be imparted to the right front wheel 112 by the hydraulic brake 117 and electric braking-force production section 122 for the right wheel 112.

Meanwhile, braking force that is ⅙ of the leg power can be imparted to the left rear wheel 113 by the electric braking-force production section 123, and braking force that is ⅙ of the leg power can be imparted to the right rear wheel 114 by the electric braking-force production section 124.

In the brake apparatus 110, however, the electric braking-force production sections 121, 122, 123 and 124 may become inoperative due to a failure of the power supply or the like. In such a case, only the hydraulic brakes 116 and 117 are activated by the fluid pressure produced by the master cylinder 17, and thus, the fluid pressure to be produced by the master cylinder 17 has to be increased to a level such that necessary braking can be effected only by the hydraulic brakes 116 and 117.

In the latter-half operation amount region E2 (more particularly, region E3 close to the amount S5), as shown in FIG. 4, the brake pedal device 11 can increase the lever ratio (i.e., ratio of the pedal operation amount to the push rod movement amount) in response to increase of the pedal operation amount. Thus, the push rod 86 is allowed to impart a greater output (pressing force) in response to a given leg power applied to the brake pedal 12. As a consequence, the second embodiment of the invention can increase the fluid pressure to be produced by the master cylinder 17 to a level such that necessary braking can be effected only by the hydraulic brakes 116 and 117, without imposing a great load on the human driver. In addition, the second embodiment of the brake pedal device 110 can afford the same advantageous benefits as the first embodiment of the brake apparatus 10.

Third Embodiment

Figure 9:
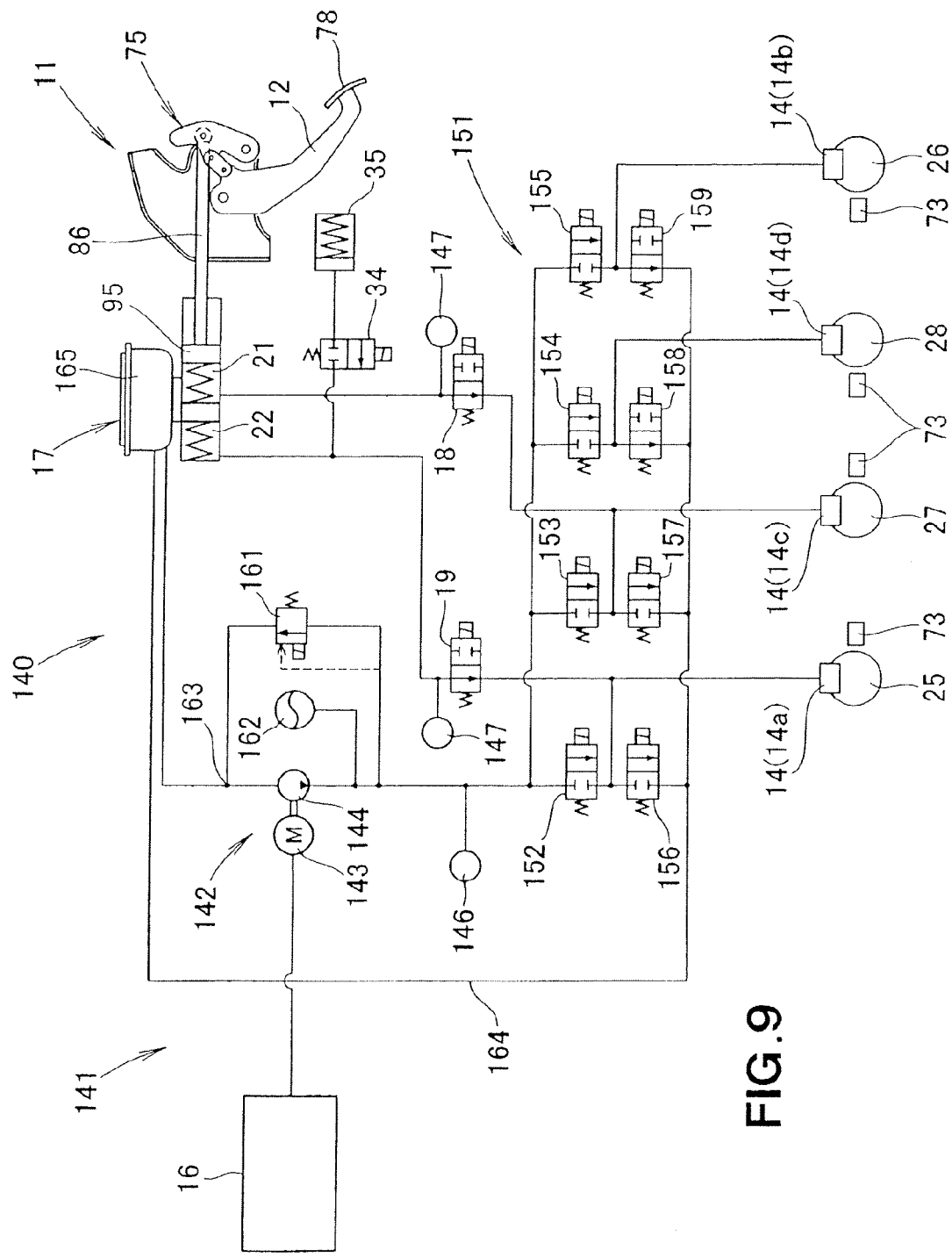
FIG. 9 is a diagram showing a fluid pressure circuit of a third embodiment of the brake apparatus of the present invention.
Figure 10:
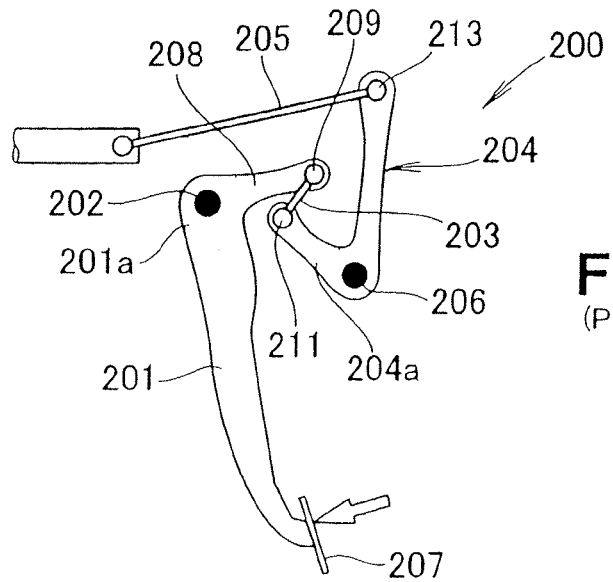
FIG. 10 is a side view of a conventionally-known brake pedal device.
Figure 11A:
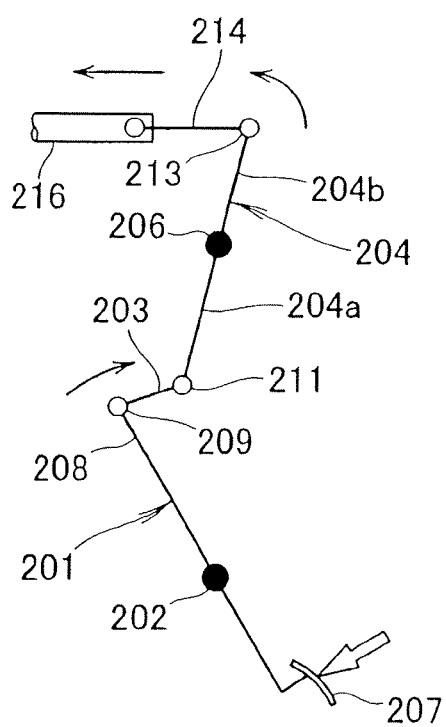
FIGS. 11A and 11B are views schematically showing behavior of the conventionally-known brake pedal device.
Figure 11B:
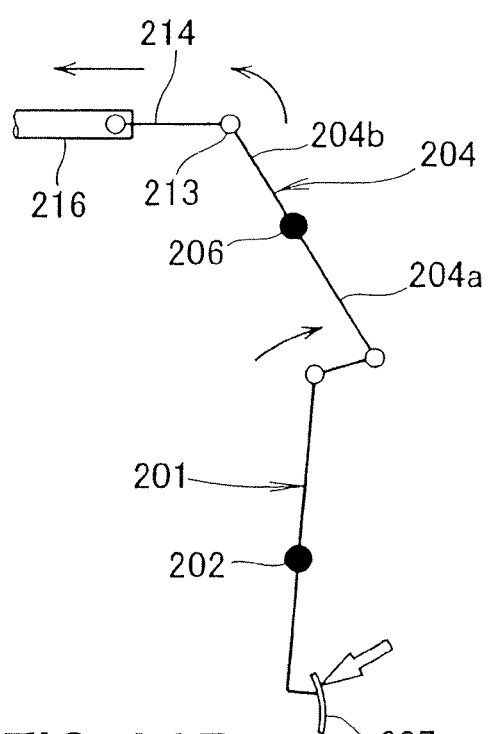
Figure 12:
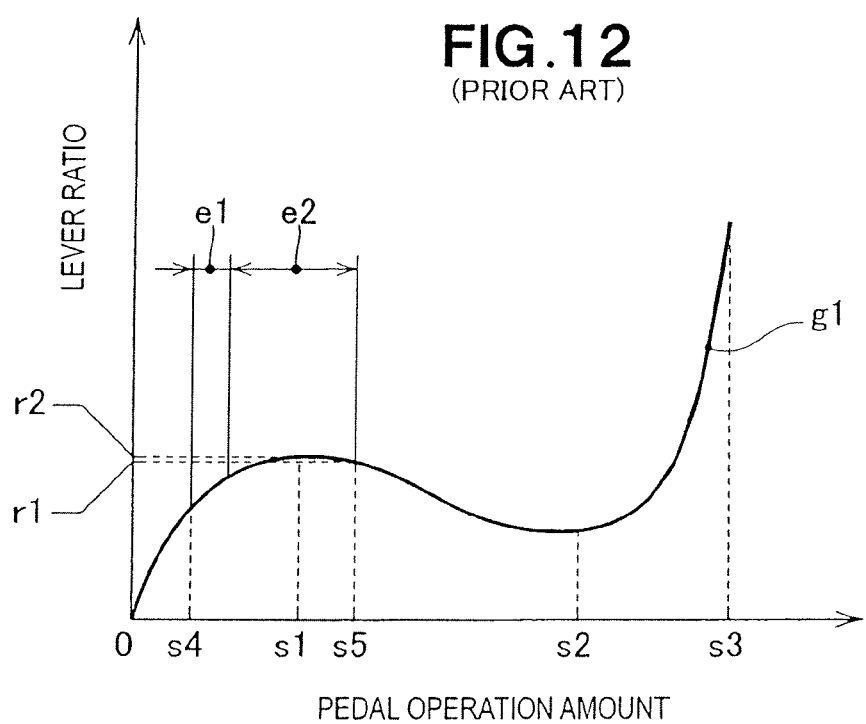
FIG. 12 is a graph showing relationship between a pedal operation amount and a lever ratio of the conventionally-known brake pedal device.

Further, FIG. 9 is a diagram showing a fluid pressure circuit of a third embodiment of the brake apparatus 140 of the present invention. The brake apparatus 140 includes: the brake pedal device 11 having the brake pedal 12 incorporated therein; the brake cylinders 14 for applying braking force to the wheels; an electric braking-force control device 141 capable of electrically controlling the braking force in accordance with an operation amount or leg power (operating force) of the brake pedal 12; and the master cylinder 17 for producing pressure of a brake fluid in response to operation of the brake pedal 12; and a pair of block valves (block members) 18 and 19 for blocking communication of the brake fluid between the master cylinder 17 and the brake cylinders 14.

The electric braking-force control device 141 includes an electric braking-force production section 142 for producing braking force in response to operation of the brake pedal 12, and the control section 16 for controlling the braking-force production section 142 in accordance with the operation amount or operating force of the brake pedal 12.

The braking-force production section 142, which produces braking force through an electromagnetic force, includes a pump motor 143 that is driven on the basis of a signal given from the control section 16, and a pump 144 that is driven by the pump motor 143.

The following lines describe behavior of the brake apparatus 140 when the apparatus 140 is in normal operation. As the human operator operates the brake pedal 12 by applying a leg power to the brake pedal 12, the block valves 18 and 19 are closed, and the reactive-force permitting valve 34 is opened. With the block valves 18 and 19 closed, the brake cylinders 14 are cut off from the master cylinder 17.

At the same time, the pump 144 is driven by the pump motor 143 of the braking-force production section 142, so that increased fluid pressure is delivered to the brake cylinders 14 to activate the disk brake devices 25, 27, 28 and 26. In the braking-force production section 142, the pump motor 143 is controlled so that fluid pressure detected by a fluid pressure sensor 146 is kept within a preset range.

During operation of the disk brake devices 25, 27, 28 and 26, the leg power (i.e., requested braking force) applied to the brake pedal 12 is detected on the basis of fluid pressure detected by a fluid pressure sensor 147. Then, fluid pressure to be applied to the brake cylinders 14 is determined such that braking force corresponding to the detected leg power can be obtained.

Then, a fluid pressure control valve device 151 (namely, pressure-increasing linear valves 152-155 and pressure-reducing linear valves 156-159) is controlled in such a manner that the actual fluid pressure acting on the brake cylinders 14 agrees with the determined fluid pressure.

It is possible that, during a braking operation of the brake apparatus 140, some of the wheels will present an increased slip ratio to get into a lock tendency. In this case, that the wheel has gotten into a lock tendency is detected on the basis of the output of the wheel speed sensors 73.

Once such a wheel lock tendency is detected, ABS control is performed by the fluid pressure control valve device 151. Namely, when any of the wheels has gotten into a lock tendency, the instant embodiment causes a greatest possible braking force to be produced while limiting the lock of the wheel, by controlling the individual pressure-increasing linear valves 152-155 and pressure-reducing linear valves 156-159.

Upon satisfaction of an air discharge permission condition to allow air to be discharged from the liquid pressure circuit of the brake apparatus 140, not only a relief valve 161 is switched to an open state, but also the individual pressure-increasing linear valves 152-155 and pressure-reducing linear valves 156-159 are switched to an open state. Simultaneously, the pump 144 is driven by the pump motor 143.

Thus, an accumulator 162 and connection section 163 are brought into fluid communication with each other, so that a high-pressure operating fluid is emitted from the accumulator 162 through the pump 144. The thus-emitted operating fluid is supplied to a reservoir 165 of the master cylinder 17 by way of the pressure-increasing linear valves 152-155, pressure-reducing linear valves 156-159 and pressure reducing path 164, so that air is discharged from the reservoir 165. The aforementioned air discharge control is brought to an end upon satisfaction of an air discharge end condition.

In the brake apparatus 140, the electric braking-force production section 142 may become inoperative, for example, due to a power supply failure. In such a case, necessary braking is effected on the basis of the fluid pressure produced in the master cylinder 17 in place of the fluid pressure produced in the electric braking-force production section 142. Once the power supply fails, the block valves 18 and 19 are opened, and the reactive-force permitting valve 34 are closed. Simultaneously, the pressure-increasing linear valves 152-155 and pressure-reducing linear valves 156-159 are closed.

With the reactive-force permitting valve 34 closed, the fluid pressure produced in each of the first fluid pressure chambers 21 and 22 of the master cylinder 17 can be prevented from being absorbed in the operation amount simulator 35.

Further, with the block valves 18 and 19 opened and pressure-increasing linear valves 152-155 and pressure-reducing linear valves 156-159 closed, the fluid pressure produced in the first fluid pressure chambers 21 and 22 can activate the brake cylinders 14a and 14c of the brake devices 25 and 27 for the left and right front wheels by way of the block valves 18 and 19. As a consequence, necessary braking force can be produced appropriately even when the power supply is in failure.

When braking force is to be produced by the fluid pressure of the master cylinder 17, it is necessary to increase the fluid pressure of the master cylinder up to necessary braking fluid pressure only by a leg power applied to the brake pedal 12 by the human driver.

In the latter-half operation amount region E2 (more particularly, region E3 close to the amount S5), as shown in FIG. 4, the brake pedal device 11 can increase the lever ratio (i.e., ratio of the pedal operation amount to the push rod movement amount) in response to increase of the pedal operation amount. Thus, the push rod 86 is allowed to impart a greater output (pressing force) in response to a given leg power applied to the brake pedal 12. As a consequence, the third embodiment can increase the fluid pressure to be produced by the master cylinder 17 to a necessary braking level, without imposing a great load on the human driver. In addition, the third embodiment of the brake pedal device 140 can afford the same advantageous benefits as the first embodiment of the brake apparatus 10.

Whereas the first, second and third embodiments 10, 110 and 140 have been described above in relation to the case where the transmission unit 75 of the brake pedal device 11 uses a link mechanism to permit variation of the lever ratio, the present invention is not so limited, and the lever ratio may be varied via any suitable mechanism, other than the link mechanism, employing a gear, cam or the like. In another alternative, the lever ratio may be varied via a construction where a pivot point of a link or output point of the push rod is moved by an actuator.

Further, whereas the first, second and third embodiments 10, 110 and 140 have been described above as using the brake pedal 12 of the pendant type, the present invention is not so limited, and the brake pedal may be of the so-called organ type mounted on a vehicle floor section of the vehicle. Furthermore, although the brake pedal 12 has been described above as the operation member of the brake apparatus, the present invention is not so limited, and it may use a manually-operable operation lever.

Furthermore, whereas the first, second and third embodiments 10, 110 and 140 have been described above as using the block valves 18 and 19 as blocking members, the blocking members may be other than the block valves 18 and 19. For example, the ports 55a and 55b of the cylinder body 42 shown in FIG. 1 may be used as the blocking members in place with the block valves 18 and 19 as long as the ports 55a and 55b permit kickback during the ABS control etc. by being closed with the respective pistons 51 and 52.

INDUSTRIAL APPLICABILITY

The present invention is well suited for use in automotive vehicles provided with a brake apparatus having an operation member and master cylinder interconnected via a transmission unit.

The invention claimed is:

1. A brake apparatus comprising:
an operation member;
a brake cylinder;
an electric braking-force control device for electrically controlling braking force in accordance with an operation amount or force of said operation member;
a master cylinder for producing pressure of a brake fluid;
a transmission unit for operatively connecting said operation member to said master cylinder;
a block member for blocking communication of the brake fluid between said master cylinder and said brake cylinder; and
a simulator for accumulating the brake fluid supplied from the master cylinder while said block member is in an opened state;
wherein said transmission unit is a mechanism capable of varying a ratio between an output amount of an output member thereof connected to said master cylinder and the operation amount of said operation member;
wherein in a normal operation, with the communication of the brake fluid between the master cylinder and the brake cylinder blocked by the block member, the braking force of the brake cylinder is controlled, via the electric braking-force control device, in accordance with the operation amount or force of the operation member in a former-half operation amount region of the operation amount of the operation member, in which the amount of brake fluid supplied from the master cylinder to the simulator is controlled via the transmission unit not to become greater than an accumulation amount of brake fluid in the simulator;
wherein, in an abnormal operation of the electric braking-force control device, with the block member placed in an opened state, the fluid pressure of the master cylinder is supplied directly to the brake cylinder; and
wherein in a latter-half operation amount region of the operation amount of said operation member, which corresponds to a region in which the amount of braking fluid supplied from the master cylinder exceeds the accumulation amount of the braking fluid in the simulator, a ratio of the operation amount of said operation member to the output amount of the output member is controlled, via said transmission unit, to increase in response to increase of the operation amount of said operation member.

2. The brake apparatus of claim 1, wherein the ratio of the operation amount of said operation member to the output amount of the output member is controlled, via said transmission unit, to be smaller in the former-half operation amount region of the operation amount of said operation member than in the latter-half operation amount region of the operation amount of said operation member.

3. The brake apparatus of claim 1, wherein, when the brake fluid is accumulated in said simulator up to a predetermined maximum accumulation amount by said operation member being operated by a predetermined operation amount and then the operation amount of said operation member is further increased beyond the predetermined operation amount while said block member is in the opened state, the ratio of the operation amount of said operation member to the output amount of the output member is controlled to increase in response to increase of the operation amount.

4. The brake apparatus of claim 1,
   wherein said transmission unit includes a pivot link connected via the output member to said master cylinder, and a connection link interconnecting said pivot link and said operation member; and
   wherein said connection link is arranged to be pulled away from said pivot link by said operation member as said operation member is operated from a non-operating position of said operation member.

* * * * *